June 1, 1954
G. E. FORD
2,680,214
THERMAL RESPONSIVE CONTROL SYSTEM
Filed Jan. 16, 1948
3 Sheets-Sheet 1
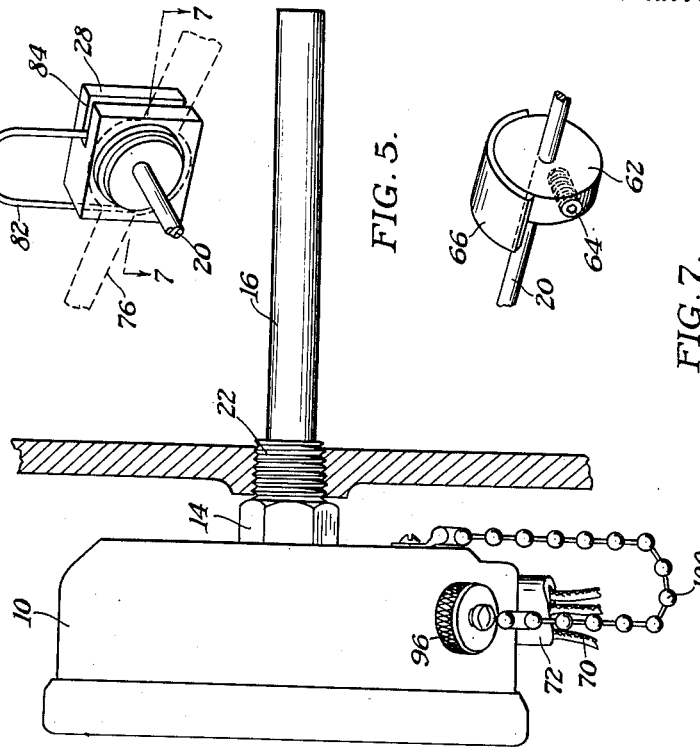
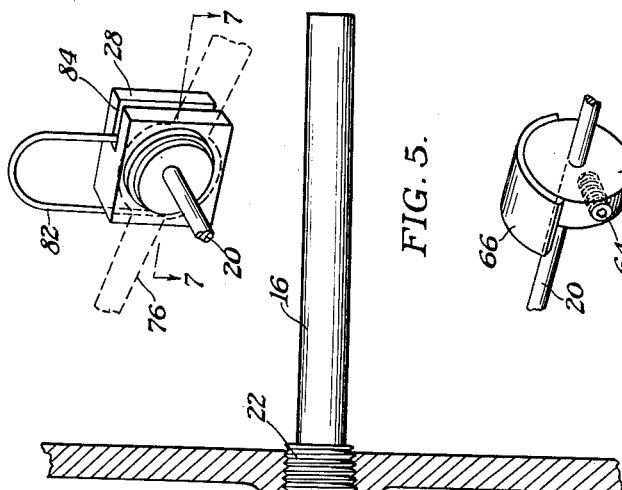
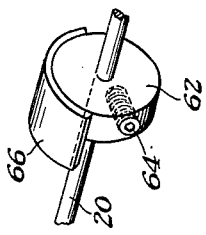
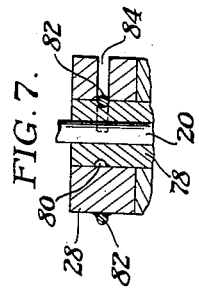
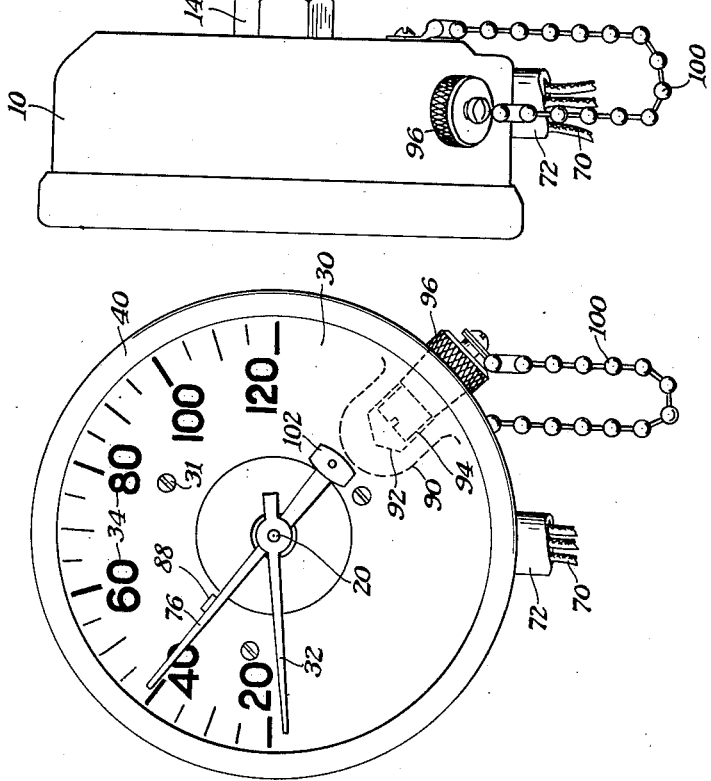
GEORGE E. FORD
INVENTOR.
BY Charles Shepard
ATTORNEY

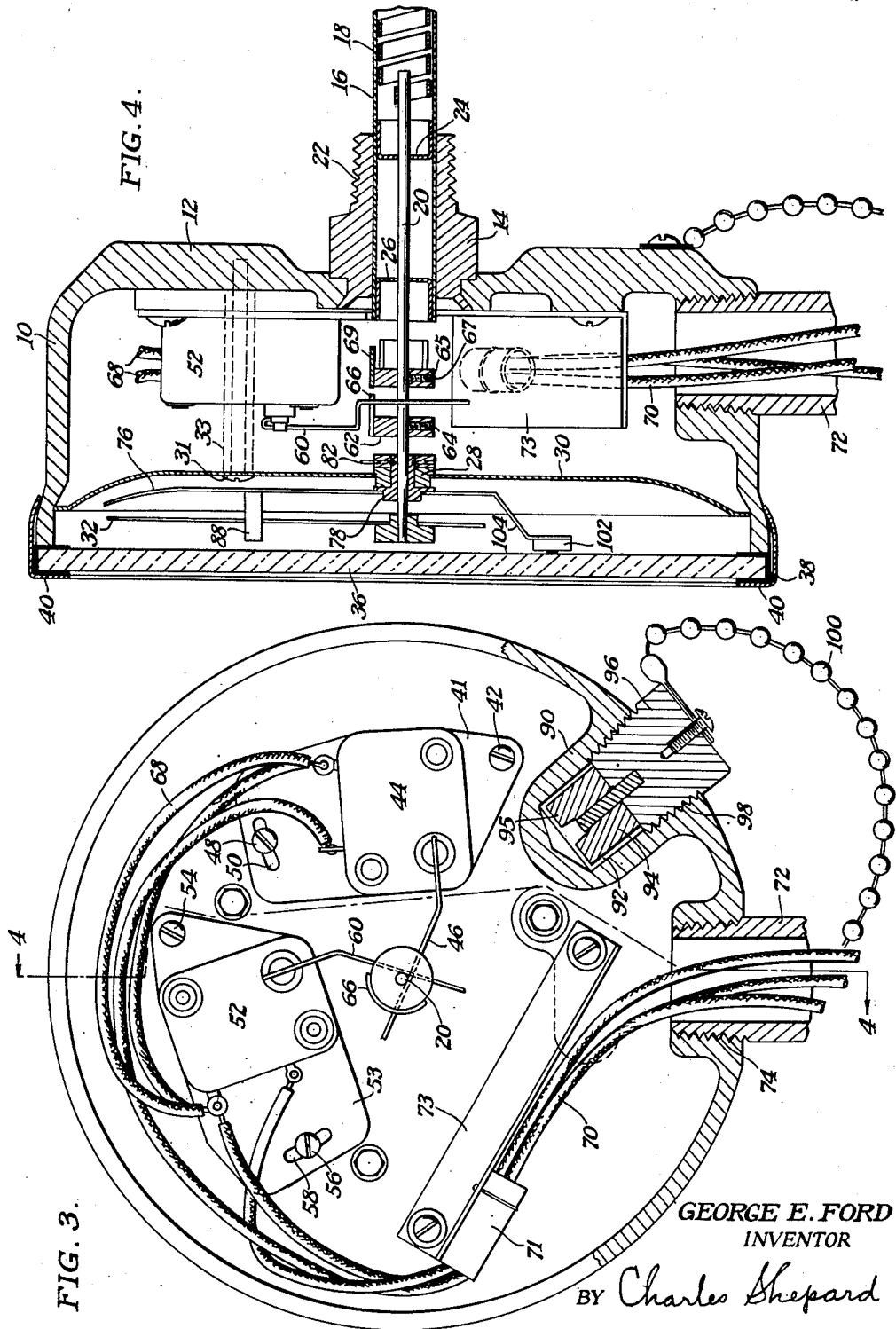
June 1, 1954     G. E. FORD     2,680,214
THERMAL RESPONSIVE CONTROL SYSTEM
Filed Jan. 16, 1948     3 Sheets-Sheet 2
GEORGE E. FORD
INVENTOR
BY Charles Shepard
ATTORNEY June 1, 1954  G. E. FORD  2,680,214
THERMAL RESPONSIVE CONTROL SYSTEM
Filed Jan. 16, 1948  3 Sheets-Sheet 3

GEORGE E. FORD
INVENTOR
BY Charles Shepard
ATTORNEY

Patented June 1, 1954

2,680,214

UNITED STATES PATENT OFFICE 2,680,214

THERMAL RESPONSIVE CONTROL SYSTEM

George E. Ford, Brighton, N. Y., assignor to Quatitrol Corporation, East Rochester, N. Y., a corporation of New York Application January 16, 1948, Serial No. 2,575

1 Claim. (Cl. 317—14)

This invention relates to thermometers and to other indicating instruments, and particularly to a dial type of instrument adapted to be attached to a tank or container, or to other chambered structures, such as pasteurizers, transformers, water heaters, etc. It is an object of the invention to provide a rugged and durable instrument of this character, and also one which includes a thermally-responsive element effective to cause circumferential travel of a pointer around a calibrated or graduated dial.

Another object of the invention is the provision of an improved and more satisfactory indicating instrument structure having electric switch means operable when the variable factor indicated by the instrument reaches a predetermined value, for controlling an electric circuit connected to an alarm or signal at a remote point.

Still another object is the provision of an improved arrangement for accurately adjusting or varying the value at which the electric switch will be operated.

A further object is the provision, in an indicating instrument, of an improved and more satisfactory resettable registering hand or pointer for registering the extreme value (either maximum or minimum) which was indicated by the instrument since the last resetting of the hand or pointer.

A still further object is the provision of simplified and improved means for resetting the extreme value registering hand in a quick and easy manner, the resetting means being so designed that it does not interfere with or destroy the desirable tight sealing of the case of the instrument.

A still further object is the provision of an indicating instrument with a resettable extreme value hand or pointer, the hand being so mounted and the resetting means being so designed that the entire instrument may be tightly sealed and may be made entirely leakproof or submersible, if desired.

Yet another object is the provision of a single unitary instrument capable of being mounted in a single opening in a transformer casing or other container, and which will efficiently and reliably perform the indicating functions and the control or operating functions which have heretofore been performed by a plurality of separate instruments mounted in separate openings in the transformer casing or other container.

A further object is the provision of an improved control system for controlling the operation of an electric transformer.

A still further object is the provision of temperature-responsive electric switch means which is automatically self-compensating for changes in ambient temperature, so that the switch means is operated at one temperature when the ambient temperature has one value and is operated at a different temperature when the ambient temperature has a different value.

These and other desirable objects are accomplished by the construction disclosed as an illustrative embodiment of the invention in the following description and in the accompanying drawings forming a part hereof, in which:

Fig. 1 is a front elevation of a complete thermometer constructed in accordance with the present invention;

Fig. 2 is a side elevation thereof;

Fig. 3 is an enlarged front elevation with the dial, pointers, and front cover removed;

Fig. 4 is a section approximately on the line 4—4 of Fig. 3;

Fig. 5 is a perspective view of a cam-like member for operating the electric switch previously mentioned;

Fig. 6 is a perspective view of certain parts for mounting the resettable hand or pointer;

Fig. 7 is a section taken substantially on the line 7—7 of Fig. 6;

The same reference numerals throughout the several views indicate the same parts.

Figure 8:
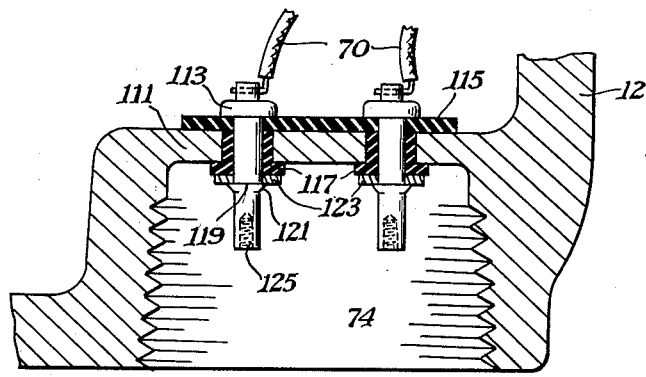
Fig. 8 is a diagrammatic vertical section similar to the lower part of Fig. 4, showing a modified construction whereby the external electric connections may be made in a manner to keep the interior of the instrument tightly sealed.

The instrument comprises a cup-like casing 10, of cast, stamped, or molded material, into the rear wall 12 of which a bushing 14 is firmly fastened, to serve as a support for a guard tube 16 housing a well known type of bimetallic helical thermal-responsive element 18. The outer end of the tube 16, not shown, is sealed or closed, and may project into a tank or other chamber, so that heat from the contents of the tank may be transferred through tube 16 to the element 18 and thus rotate a shaft 20 to which one end of the element 18 is fixed, the other end thereof being anchored to the tube 16. A threaded portion 22 on the bushing 14 may be screwed into a suitable socket on the tank.

The shaft 20 is revolvable in suitable bearings 24, 26 supported in the tube 16, and in another bearing 28 set in the dial 30 which is supported by screws 31 threaded into posts 33 mounted on and projecting forwardly from the rear wall of the casing 10. A pointer 32 is fixed to the front end of the shaft. When the shaft is rotated by variations in the temperature of the liquid, gas, or other material surrounding the tube 16, the pointer 32 moves over the scale characters 34 placed on the dial 30.

A cover-glass 36 is surrounded on its periphery by a U-shaped gasket 38, and a rim 40 of a bezel member bears on the gasket and is suitably fastened to the casing 10, so that the front of the instrument is tightly sealed. The parts thus far described may be of conventional construction, and the details thereof may be varied considerably without departing from the present invention.

Mounted on a mounting plate 41 fastened to the rear wall of the case by a screw stud 42 is a circuit controller 44, in the present instance shown as a "micro" switch, and having an actuating arm 46 lying approximately tangent to the shaft 20. A second screw stud 48 passes through a slot 49 in the switch plate 41, and by loosening this stud 48 the entire switch may be rotated through a limited arc about stud 42, in order to obtain a very accurate adjustment of the actuating arm 46 relatively to other parts, as will be presently described. A similar switch 52, fixed to a plate 53, mounted on studs 54 and 56 and having a slot 58, may also have an actuating arm 60 lying approximately against shaft 20. As in microswitches commonly in use, the arms 46 and 60 are urged toward shaft 20 by light springs, not shown. One of these switches may be operated at a preselected upper temperature limit and the other may be operated at a lower temperature limit. The switch arms 46 and 60 may be made of stiff wire or other suitable material of reasonable rigidity, but it is usually preferred to make them of bi-metallic rods, so as to obtain automatic compensation for ambient temperature changes, as explained in greater detail below.

The means for operating each of the controllers or switches 44 and 52 comprise the cam-like members shown best in Fig. 5. The body portion of the member is a small disc 62 sufficiently thick so that it may contain a radial bore which is tapped to receive a set screw 64 adapted to grip the shaft 20. The disc 62 has an arcuate overhanging rim 66 fixed to its periphery, and projecting sufficiently beyond the face of the disc (in a direction axially of the shaft) to sweep against the arm 46 in the manner of a cam as the shaft 20 is rotated through part of the range of scale 34 under the torque of bimetallic element 18. By loosening the screw 64 and turning the disc 62 to another position on shaft 20 and then setting up the screw again, a switch may be caused to operate at any selected temperature indication. A second assembly of a disc 66, setscrew 67, and a rim 69 may be arranged to strike the arm 60 to operate the switch 52.

Each of the switches may be either of the two-wire or of the three-wire type, the latter being preferred. If they are of the two-wire or single circuit type, the switch contacts are closed to complete the circuit when the temperature reaches a value at which the cam 66 or 69 displaces the switch arm 46 or 60 far enough to actuate the switch, and the closed circuit lights a light or rings a bell or gives any other suitable indication at any desired remote point. If they are of the three-wire or two-circuit type, one circuit (containing for example a green light at the remote point) is normally closed, and the other is normally open. When the actuating arm is displaced far enough, the switch is operated to open the first circuit and to close the second circuit which contains, for example, a red light and a bell at the remote point. The details of interior construction of such microswitches, both of the single circuit and two circuit types, are well known and need not be shown here.

As arranged in the instrument illustrated herewith, one switch may be actuated to operate an alarm or signal at a selected low temperature, and the other may be actuated to operate the same or a different alarm or signal at a selected upper temperature limit. Wires 68 and 70 are suitably connected with the switches to permit individual operation thereof, and these wires may be led from the interior of the case 10 through a conventional electric conduit 72 screwed tightly into a tapped bottom orifice 74 in the case 10.

In order that a user of the instrument may be apprised of the extreme limit (either upwardly or downwardly or both) of variations in the factor being indicated by the instrument, without having to watch it all the time, a freely movable "reset" pointer 76 is provided. This pointer is tightly pressed onto the end of a bearing sleeve or bushing 78 which loosely surrounds the shaft 20 and is revolvable in the bearing 28, being fastened in the latter against longitudinal movement by suitable means such as an annular groove 80 formed externally around the bushing 78 near the rear end thereof, in which groove is resiliently pressed one side of a spring wire 82 soldered at one end to the bearing 28 behind the dial plate, the spring wire being bent into U-shape and the free end thereof being loosely received in a slot 84 formed in the bearing member 28 in a plane perpendicular to the shaft 20. The slot 84 extends inwardly about to the axis of the shaft, so that the free part of the spring wire, received in the slot, may bear against the walls of the annular groove 80, and the slot 84 prevents displacement of the spring wire in a direction axially of the shaft; thus the wire holds the bushing 78 against axial displacement in the bearing 28. But by forcibly displacing the free end of the wire 82 radially outwardly from the bushing 78 far enough to be clear of the annular groove 80, the bushing is released for removal from the bearing if necessary.

The reset pointer or hand 76 carries a lug 88 which projects forwardly a sufficient distance to lie in the path of the pointer 32. When the latter moves in one direction (clockwise, in Fig. 1) it will engage the lug 88. Then pointer 32 will carry pointer 76 with it as far as it goes, but will not move the pointer 76 in the opposite direction when the pointer 32 starts to move in the opposite direction. Thus pointer 76 will remain at whatever extreme value was indicated by the pointer 32 since the last resetting of the pointer 76.

If it is desired to have the resettable pointer give an indication of the extreme movement of the pointer 32 in a counter-clockwise direction rather than a clockwise direction, the lug 88 is formed on the left or counter-clockwise edge of the resettable pointer 76 instead of the right edge, and is engaged by the left or counter-clockwise edge of the pointer 32, instead of the right edge. If desired, two resettable pointers may be used, to give indications of extreme variations in both directions of the quantity being measured, be it heat (as in the case of a thermometer) or some other factor such as pressure, liquid level, etc.

Inasmuch as an important feature of the present device is its vapor-proof construction, it is obvious that any opening into the case 10 through which the pointer 76 may be manipulated would be detrimental and undesirable. Means are provided, therefore, by which the pointer 76 may be reset from the exterior of the instrument, without the necessity of any shaft or other movable part extending through the closure glass 36 or through any other sealing wall of the case.

An inwardly directed boss 90 forming a part of the case 10 is drilled from the exterior of the case to form a cavity or recess 92 to receive a magnet 94 mounted on one end of a plug 96 that may be easily screwed into tapered threads 98 cut in the walls at the entrance of the cavity 92. A fastening chain 100 secured to the case 10 and to the plug 96 prevents the magnet and plug from being accidentally mislaid.

To reset the pointer 76, the user unscrews the plug 96 and places the bipolar end 95 of the magnet 94 against the outer face of the cover glass 36, in line with a smaller magnet 102 that is fixed to the short end or heel of the pointer 76, this end of the pointer being offset in an outward direction at 104 so that the magnet 102 lies close to the inner face of the glass 36, as seen in Fig. 4, while the main part of the pointer 76 lies inwardly of the pointer 32 and at a considerable distance from the glass 36. When the magnet 94 is wiped slowly around the outer surface of the glass 36, the magnet 102 will follow the magnet 94 until the lug 68 comes into contact with the edge of the pointer 32, thus resetting the pointer 76. Then the plug 96 carrying the magnet 94 is screwed back into the cavity 92, where the magnet 94 is protected from accidental contact with other articles and is out of the way until needed for the next resetting operation.

Mounted on the rear wall of the casing 12 is an angle member 73, as shown in Figs. 3 and 4, this angle member or bar having one flange resting on the front face of the rear wall of the casing and held thereto by rivets or screws or bolts, as shown, and having its other flange projecting forwardly as indicated in the drawings, so that during the making of the electrical connections, when the wires 70 are being manipulated by the electrician who makes the external connections, there is no danger of the wires being shoved upwardly, into the case far enough to contact with and damage the moving parts or to get in the way of the movement of the parts. Also, the wires are firmly anchored by being tightly tied at 71 to the under surface of the forwardly projecting flange of the angle bar at its upper left end, as seen in Fig. 3, so that a downward pull on the wires will be resisted by the tight tying 71 and will not cause any stress on the connections of the wires to the delicate microswitches.

The microswitches 44 and 52 are of the usual type well understood in the art, in which the switch is actuated at an intermediate point in the range of swing of the operating arm 46 or 60. Also, as is well understood in the art, the movement of the operating arm 46 or 60 offers negligible resistance. Hence, when the cam member 66 presses against the arm 60 of the switch 52, for example, and displaces it far enough to actuate the switch 52, the movement of the actuating arm does not necessarily stop at that point. If the temperature continues to change in the same direction, after the switch has been actuated, the shaft 20 can easily continue to turn, thereby displacing the arm 60 still further, without causing any appreciable increase in the very slight resistance which the actuating arm 60 offers to the rotary movement of the shaft 20. It will be understood, of course, that the actuating arms of the microswitches are lightly biased to swing in a direction toward the shaft 20, so that whenever the displacing force of the cams is removed or decreased, the actuating arms will swing back toward the shaft 20, and into contact with the shaft as a limit stop, if the cams are not positioned so as to displace the arms away from the shaft.

The electric switches have been referred to above as microswitches. However, they are sometimes known in the art as snap switches, and under one or the other of these two names, they will be familiar to those skilled in the art.

As already mentioned, the present improved mounting and operation of the resettable hand or pointer 76 permits the instrument to be tightly sealed, so far as the resettable hand or pointer is concerned. The seal may, if desired, be so complete that the entire instrument may be flooded or immersed in liquid without any of the liquid getting into the interior of the instrument casing. To this end, the electric wires 70 may be suitably sealed in the conduit 72 at any desired point, or instead of letting the wires extend out of the casing through the conduit, the wires may be connected to prongs extending tightly or in a sealed manner through a transverse partition associated with the tapped opening 74 in the casing. One form of such a sealed connection for the wires, which may be used here if desired, is illustrated in Fig. 5 of the drawings of my copending United States patent application entitled Alarm Gauge, Serial No. 2576, filed January 16, 1948, now Patent No. 2,620,412. A similar but slightly different form of seal is illustrated in Fig. 8 of the drawings of the present application, in which the casing 12 is provided with an integral transverse partition 111 extending across and closing the inner end of the tapped recess 74. The wires 70 (of any desired number) are individually connected inside the casing to separate metallic prongs 113 having heads which lie against the inner face of an insulating washer 115 which lies on the inner side of the integral partition 111. The shanks of the prongs 113 extend through insulating bushings 117 in holes formed in the partition 111, and each prong 113 has a shoulder 119 which lies externally of the partition 111 and which is staked over as indicated at 121, against a metallic washer 123 which surrounds the prong 113 and lies tightly against the outer end of the insulating bushing 117. It will be understood, of course, that each prong 113 forms a tight fit in the insulating bushing 117, and that the latter forms a tight fit in its hole in the partition 111, so that a completely tight seal is provided at this point, preventing entrance of vapor or moisture into the instrument case.

A suitable connection plug may be thrust over the exposed outer ends of the prongs 113, or the external wires may each be connected to its individual prong by a set screw screwed into a tapped bore 125 formed axially in the end of the prong 113. The external wires, however connected to the prongs, may then extend out through the tapped opening 74 in the casing, or through a conduit screwed into the tapped opening.

Two electric switches within the casing have been illustrated in Fig. 3, but it will be apparent from what has been said above that any desired number of such switches (within the limits of the size of the casing) may be similarly mounted in the casing, the actuating arm of each switch being controlled by its own separate cam on the shaft 20. Three such switches are indicated diagrammatically in Fig. 9 of the present drawings, which show a further embodiment of the invention, reference to which is now made.

Figure 9:
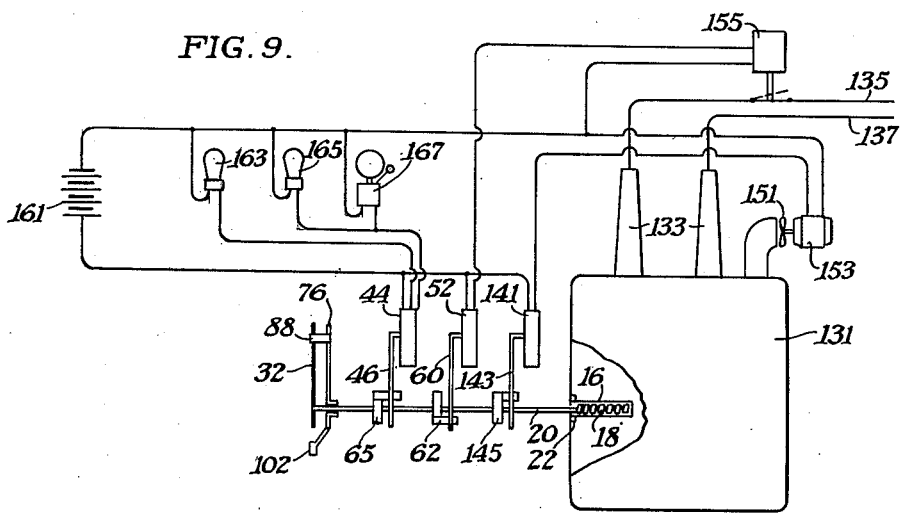
Fig. 9 is a diagrammatic view of an indicating and control assembly constituting part of the present invention.

In this embodiment illustrated diagrammatically in Fig. 9, there is shown at 131 the casing of an electric transformer of the oil-filled type, the high tension leads of which extend out through insulating bushings 133 to the line wires 135 and 137.

The casing 131 is provided with a lateral opening into which is screwed the fitting 22 of the present instrument, either directly or in a protecting well, in such manner that the tube 16 (Fig. 4) extends into the transformer casing, either immersed directly in the oil or in close proximity to the walls of a protecting well which is immersed directly in the oil, so that the bimetallic element 18 of the instrument is responsive to the temperature of the insulating oil in the transformer casing 131. A rise or fall in the temperature of the oil in the casing accordingly, through the action of the bimetallic element 18, turns the shaft 20 and with it turns the indicating hand or pointer 32, and if this hand or pointer exceeds its previous limit attained since the last resetting, this hand or pointer will also move the resettable pointer 76 as previously explained.

Within the casing of the instrument (which casing is omitted for the sake of clarity in Fig. 9) there are mounted three microswitches or snap switches, two of them being designated by the numerals 44 and 52 (the same numerals used to designate the switches in Fig. 3) and the third switch being shown at 141. The operating arm 46 of the switch 44 is controlled by its cam 65 on the shaft 20, the operating arm 60 of the switch 52 is controlled by its cam 62 on the shaft 20, and the operating arm 143 of the switch 141 is controlled by its cam 145 on the shaft 20. In the form of the invention here shown in Fig. 9, the switch 44 is of the three wire type and the switches 52 and 141 are of the two wire type.

A blower or fan indicated diagrammatically at 151, operated by an electric motor 153, is arranged to blow air into the transformer casing 131 for cooling purposes. At 155 there is indicated diagrammatically any suitable form of circuit breaker, either solenoid operated or motor operated, to open the circuit of the main wires 135 and 137 feeding the transformer in the casing 131.

A suitable local source of electric power is indicated diagrammatically at 161. This local source of power is connected, through the switches 44, 52, and 141, to the various indicating and operating instrumentalities as shown in Fig. 9. These instrumentalities include a signal such as a green light 163 connected to the normally closed circuit of the three wire switch 44, a red light 165 and a bell 167 both connected in parallel or multiple to the normally open circuit of the three wire switch 44, and the circuit breaker 155 connected to the circuit of the switch 52, and the fan motor 153 connected to the circuit of the switch 141, as shown. The operation of these instrumentalities is as follows:

When the temperature of the insulating oil in the transformer casing 131 is within its optimum range, the switches 52 and 141 are both open, and the switch 44 has its normally closed circuit closed so that the green light 163 is lit at the attendant's control station, which may be near or remote relative to the transformer. The normally open circuit of the switch 44 is open, and the red light 165 and bell 167 are not in operation.

As the temperature of the insulating oil in the casing 131 rises, the switches 44 and 52 are not at first operated, but the switch 141 is operated by its cam 145 to close the circuit of this switch and thereby start the motor 153, to operate the fan or blower 151 to force cooling air into the transformer in an effort to prevent further rise in the temperature of the transformer.

If the temperature of the transformer oil rises a few more degrees, notwithstanding the operation of the blower, then the cam 65 operates the switch 44 to open the normally closed circuit and extinguish the green light 163, and to close the normally open circuit and light the red light 165 and ring the alarm bell 167, thus warning the attendant of the fact not only that the temperature of the oil in the transformer 131 has risen to the point where the blower 151 has commenced operation, but also that the operation of the blower has not stopped the rise in temperature and that the rise in temperature has continued.

If the temperature rises a few degrees further, to a really dangerous condition, then the cam 62 operates the switch 52 to operate the circuit breaker 155, opening the transformer circuit and taking the defective transformer out of service entirely.

Whenever the attendant visits the transformer, he may observe the pointer 32 and thus see exactly what the temperature of the oil is at that moment, and he may also observe the pointer 76 and thus see what the maximum temperature of the oil has been since he last visited the transformer and reset the pointer 76.

This embodiment of the invention illustrated in Fig. 9 of the present drawings is a particularly noteworthy advance in the art of monitoring and controlling electric transformers, because all the functions above described can be performed, according to the present invention, by a single unitary instrument inserted in a single opening in the wall of the transformer casing. Heretofore, it has required, according to usual practice, three separate instruments, namely, a thermometer inserted in one opening in the wall of the transformer casing, so that the attendant may at any given time see the temperature of the oil in the transformer casing; a separate thermostat switch inserted in a second opening of the transformer casing for controlling the operation of the blower or fan; and another thermostat switch inserted in a third opening in the transformer casing, for controlling the operation of the circuit breaker in case the temperature in the transformer casing rises to a dangerous level. Thus it has heretofore been necessary to provide three separate openings in the transformer casing, and three separate and distinct instruments to go in those openings to perform the necessary functions, all of which are adequately and efficiently performed by the single unitary instrument of the present invention.

A further feature of the present invention consists in the use of bimetallic operating arms for the microswitches, so that the mechanism will automatically compensate for changes in the ambient temperature. Such compensating feature is useful in thermometers for many different control purposes, and is especially useful in connection with the control system disclosed in Fig. 9.

The compensating feature of the present invention, used in the control system of the present invention, results in the highly desirable ability to operate electric transformers substantially at maximum capacity notwithstanding wide fluctuations in temperature of the surrounding air. The limiting factor in imposing high load upon an electric transformer is the temperature of the hottest spot in the transformer winding. Yet, because of practical considerations, the thermometer is not directly responsive to the temperature of the hottest spot in the winding, but is responsive to the temperature of the cooling oil in the transformer casing. It has been discovered that the temperature of the oil in the transformer casing is not a direct function of the temperature of the transformer winding but is dependent partly upon the temperature of the transformer winding and partly upon the ambient temperature, that is, the temperature of the surrounding air which circulates around the transformer casing.

It has also been discovered that for a given temperature of the transformer winding, the oil temperature will be lower when the ambient temperature is lower, and will be higher when the ambient temperature is higher. Therefore, if it is desired to control the operation of the transformer in accordance with the temperature of the winding of the transformer, and yet to measure, not the temperature of the winding, but rather the temperature of the cooling oil, it is seen that any control apparatus dependent solely upon the temperature of the cooling oil, without compensation for changes in the ambient temperature, would have the serious disadvantage of allowing too great a load to fall on the transformer in cold weather, or, if adjustment be made for cold weather conditions, cutting out the transformer at too low a load in hot weather. These disadvantages are overcome according to the present invention by providing bimetallic compensating elements responsive to the ambient temperature (independently of the temperature of the cooling oil) for varying the oil temperature at which the switches are operated.

Figure 10:
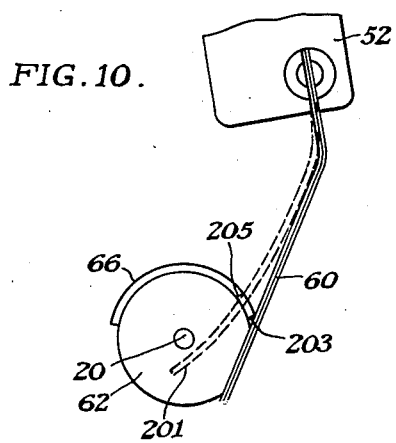
Fig. 10 is an enlarged fragmentary diagrammatic view illustrating the action of the ambient temperature compensating means.

As above briefly indicated, this is accomplished by making the switch operating arms (such as 46, 60, and 143) of bimetallic rods, or placing sections of such bimetallic rods at suitable points in these switch arms. Referring now to Fig. 10 of the present drawings, let it be assumed that the arm 60 of the switch 52 has, when relatively warm (as in summer), the shape shown in full lines. The bimetallic nature of the arm 60 causes it to curl or bend in a direction toward the dotted line shape shown at 201 as the temperature decreases, as in cold winter weather. When the parts are relatively warm and the arm has the full line shape, the advancing or leading edge of the cam 66 on the disk 62 must reach the point 203 in order to displace the arm 60 enough to operate the microswitch 52. However, under cooler ambient temperature conditions, when the switch arm 60 is bent or curled to the dotted line position 201, it is seen that the leading edge of the cam 66 need only move as far as the point 205 to produce the same action on the microswitch 52 as is produced when the cam reaches the point 203 under warmer ambient temperature conditions. The angular movement of the shaft 20 subtending the angle between the point 203 and 205 represents the correction or compensation applied to the oil temperature for a given change in ambient temperature sufficient to alter the switch arm 60 from the full line shape to the dotted shape 201.

To give a concrete example, let it be assumed that the control system is used in connection with an electric transformer in which the hottest spot in the transformer winding should not exceed 95° C. Also let it be assumed that when the ambient temperature (that is, the temperature of the surrounding air circulating around the transformer casing) is at 30° C., the temperature of the oil in the transformer casing will reach 65° C., when the hottest spot in the winding is at 95° C. Hence the cam disk 145 of the fan switch 141 is set to turn on the cooling fan 151 when the temperature of the oil rises to a little below 65° C., and the cam 62 of the circuit breaker switch 52 is set to operate the circuit breaker and take the transformer out of service when the temperature of the oil rises to a little above 65° C.

Now let it be assumed that the ambient temperature drops from 30° C., to a substantially lower temperature, such as 0° C., for example. When the air around the transformer casing is cooler, the heat transmitted to the oil from the hot winding will be lost that much quicker to the surrounding atmosphere, so that the cooling oil in the transformer casing will be at a lower temperature than was formerly the case, even though the temperature of the transformer winding may remain the same. For example, with an ambient temperature of 0° C., the temperature of the cooling oil may be at 50° C., when the winding is at 95° C. Hence under these conditions the switches, instead of operating when the thermometer registers approximately 65° should operate when the thermometer registers approximately 50°. This is accomplished by the structure illustrated diagrammatically in Fig. 10, since the full line shape of the switch arm 60 may represent the shape thereof at an ambient temperature of 65° C., and the dotted line shape 201 thereof may represent the shape of the switch arm at an ambient temperature of 50° C. Likewise the point 203 may represent the position of the leading edge or clockwise edge of the cam member 66 when the bimetallic thermometer element 18 is subjected to an oil temperature of 65° C., and the point 205 may represent the position of the leading edge of the cam 66 when the bimetallic thermometer element 18 is subjected to an oil temperature of 50 C. Hence it is seen that the desired compensation is achieved, and the control system of the present invention, when employing a compensating thermometer switch according to the present invention, enables the associated electric transformer to operate at full load at all times, notwithstanding substantial changes in ambient temperature which would result in faulty operation of a control system not having this compensating feature.

Although many of the above described features of construction find their greatest usefulness in a thermometer, and have been illustrated in connection with such an instrument, yet it should be understood that many of them are not limited to use in a thermometer, and may be advantageously employed in other indicating instruments, such as, for example, fluid pressure gauges and liquid level gauges.

Certain features disclosed but not claimed herein are claimed in my copending United States patent application entitled Alarm Gauge, Serial No. 2,576, filed January 16, 1948.

It is seen from the foregoing disclosure that the above mentioned objects of the invention are admirably fulfilled. It is to be understood that the foregoing disclosure is given by way of illustrative example only, rather than by way of limitation, and that without departing from the invention, the details may be varied within the scope of the appended claim.

What is claimed is:

A thermal-responsive control system including, in combination, an electric transformer having a casing, an electric fan for blowing cooling air into said casing, a circuit breaker controlling flow of electric current to said transformer, a shaft, a bimetallic element operatively connected to said shaft and extending into said casing for turning said shaft in accordance with variations in the temperature within said casing, a plurality of operating members adjustably mounted on said shaft exteriorly of said transformer casing to turn therewith, screw threaded means for holding each of said operating members in any adjusted position to which it is set on said shaft, a plurality of electric switches located exteriorly of said transformer casing and each having an operating arm in position to be displaced by one of said operating members as said shaft turns, a moisture tight casing surrounding and enclosing said shaft, bimetallic element, operating members and switches in a tightly sealed manner, said moisture tight casing including a screw-threaded recess having its outer end open at the exterior of said casing, a sealing wall extending across the inner end of said recess, a plurality of electric conductors extending through said sealing wall in tightly sealed relation thereto and in electrically insulated relation to said wall and to each other, an accessible electrical connection prong at the outer end of each conductor, each connection prong lying within said screw threaded recess, electric circuit connections from one of said switches to said fan, and electric circuit connections from another of said switches to said circuit breaker.

References Cited in the file of this patent

UNITED STATES PATENTS

| Number | Name | Date |
|---|---|---|
| Re. 15,929 | MacGahan | Oct. 7, 1924 |
| 1,315,996 | Simmon | Sept. 16, 1919 |
| 1,391,279 | Seignol | Sept. 20, 1921 |
| 1,595,801 | McDonald | Aug. 10, 1926 |
| 1,787,327 | Schlaich | Dec. 30, 1930 |
| 1,793,954 | Myers | Feb. 24, 1931 |
| 1,920,037 | Tauber | July 25, 1933 |
| 1,927,934 | Ford | Sept. 26, 1933 |
| 1,930,062 | Ruttenber | Oct. 10, 1933 |
| 1,932,071 | Hodges | Oct. 24, 1933 |
| 1,993,275 | Landin | Mar. 5, 1935 |
| 2,223,530 | Putman | Dec. 3, 1940 |
| 2,296,063 | Shaw | Sept. 15, 1942 |
| 2,298,229 | Putman et al. | Oct. 6, 1942 |
| 2,344,767 | Dillman | Mar. 21, 1944 |
| 2,345,131 | Leonard | Mar. 28, 1944 |
| 2,372,491 | Hausler | Mar. 27, 1945 |
| 2,376,091 | Shaw | May 15, 1945 |
| 2,449,283 | Dike et al. | Sept. 14, 1948 |
| 2,480,538 | Barr | Aug. 30, 1949 |
| 2,490,073 | Malone | Dec. 6, 1949 |
| 2,491,798 | Camilli et al. | Dec. 20, 1949 |